United States Patent [19]

Genna et al.

[11] Patent Number: 5,021,667
[45] Date of Patent: Jun. 4, 1991

[54] MOVABLE CALIBRATION COLLIMATOR AND SYSTEM AND METHOD USING SAME

[75] Inventors: Sebastian Genna, Belmont; Andrew P. Smith, Medford, both of Mass.

[73] Assignee: Digital Scintigraphics, Inc., Cambridge, Mass.

[21] Appl. No.: 251,653

[22] Filed: Sep. 30, 1988

[51] Int. Cl.$^5$ ............... G01T 1/163; G01T 1/167
[52] U.S. Cl. ................... 250/363.10; 250/363.01; 250/363.02; 250/363.04; 250/363.06; 250/363.09
[58] Field of Search ............... 250/363.01, 363.02, 250/363.04, 363.05, 363.06, 363.07, 363.10, 252.1

[56] References Cited

U.S. PATENT DOCUMENTS

| | | | |
|---|---|---|---|
| 4,095,107 | 6/1978 | Genna et al. | 250/363.04 |
| 4,228,515 | 10/1980 | Genna et al. | 250/363.07 X |
| 4,408,124 | 10/1983 | Paras | 250/252.1 |
| 4,507,733 | 3/1985 | Blum | 250/363.09 X |
| 4,584,478 | 4/1986 | Genna et al. | 250/363.04 |
| 4,593,198 | 6/1986 | Pang et al. | 250/366 |
| 4,873,632 | 10/1989 | Logan et al. | 250/363.02 X |

OTHER PUBLICATIONS

"Acquisition and Colibration Principles for ASPECT," IEEE Transactions on Nuclear Science, vol. 35, No. 1, 2/88 by Smith & Genna.
"Spectral-Spatial-Sensitivity Distortion Trands and an Accurate Correction Method in Scintillation Gamma Cameras", King et al., IEEE, Feb. 85, pp. 870-874.

Primary Examiner—Constantine Hannaher
Assistant Examiner—Jacob M. Eisenberg
Attorney, Agent, or Firm—Joseph S. Iandiorio

[57] ABSTRACT

A movable calibration collimator for a radionuclide emission tomography camera, and a calibration system using same, having a wall of material which is opaque to radionuclide emissions and is movable in a first direction relative to the camera. One or more patterns of openings are defined by the wall to pass radionuclide emissions. The openings of each pattern are aligned in a direction transverse to the first direction to provide an array of camera images upon movement of the wall relative to the camera. The number of images generated for the array are greater than the number of openings. A method of using such a calibration collimator to perform linearity correction involves installing the calibration collimator and a line source of radionuclide emissions, acquiring a camera image of the pattern of openings, and incrementing the calibration collimator for a desired number of increments. Each camera image, collected at each position of the collimator, has a position image for each opening. The camera images are combined to produce an array having a greater number of position images than the numbers of openings. Position estimation made by the camera is corrected based on the correlation between the location of the position images and the position of the openings.

22 Claims, 4 Drawing Sheets

MOVABLE CALIBRATION COLLIMATOR AND SYSTEM AND METHOD USING SAME

FIELD OF INVENTION

This invention relates to the calibration of radionuclide emission tomography cameras, and more particularly to a movable calibration collimator having a widely spaced pattern of openings which pass radionuclide emissions during incremental movement to generate an array of camera images which are much more closely spaced than the pattern of openings.

BACKGROUND OF INVENTION

Proper calibration of a radionuclide emission tomography camera is essential for accurate imaging of an object. Presently, calibration of tomography cameras is performed at the manufacturing site before the camera is shipped. Complex, bulky equipment is required to accomplish the calibration.

Calibration is accomplished at the manufacturing site by removing the standard collimator which is positioned between a radionuclide source and a detection device such as a scintillation crystal. Typically, a first calibration grid is installed having a fixed, uniform matrix of holes positioned in alignment with the centerline of photomultipliers of the camera. Scintillations emitted from the detection device are measured by a number of photomultipliers which are coupled to the scintillation crystal by a light pipe. The outputs of the photomultipliers are then initialized to match the energy levels of detected photopeaks. Alternatively, a single point source of radionuclide emissions is successively positioned in front of each photomultiplier.

A second grid having a fixed, uniform matrix of holes is then utilized for linearity corrections, that is, corrections for spatial distortions in the position estimation of a scintillation event. It is desirable for the second fixed grid to have holes more closely spaced than those of the first grid. However, the distances between the holes must be sufficiently great to enable resolution of the different hole locations: the camera must be able to match an estimated hole position with the actual hole position. If the holes are too closely spaced, a detected event cannot be correlated with the actual location of the event. Correction tables are developed to compensate for nonlinearities in position estimation.

In summary, a first fixed grid is typically used to initialize the photomultipliers, after which position analysis is performed using a second fixed grid to derive correction tables for correcting position estimates made by the camera. The spacing of holes in the fixed grids are limited, however, by the need to accurately resolve the position of an event. In other words, if the holes are spaced too closely together, and an event is detected among several known hole locations, it is difficult to determine which known hole location to match with the detected event.

After the camera is shipped and installed, however, additional calibration may be required. Distortion of the light collection optics or changes in photomultiplier operation can arise during use of the camera. While some cameras can be serviced on site, the servicing cannot be performed by the regular operators of the system. Instead, additional calibration equipment and skilled calibration personnel are required to perform the on-site calibration. Such a procedure is expensive and time-consuming, and does not encourage the camera user to perform routine calibration.

Errors in accuracy can arise from several causes. The gain of the photomultipliers can change over time which adversely affects energy resolution. Further, the junction between a photomultiplier and the light pipe can deteriorate such as by the shifting of gel; the gel normally enhances coupling of the photomultiplier with the light pipe. The uncoupling of the photomultiplier changes the collection characteristics for that photomultiplier which in turn creates nonlinearities in position estimation. Also, the photocathode in the photomultiplier is continually eroding and can erode sufficiently to adversely affect photomultiplier performance. Additional distortions can arise from a fissure in the scintillation crystal or by changes in the reflection of light within the system. Without routine calibration, however, such distortions can pass unnoticed during use of the camera even though the accuracy of the camera can be seriously diminished.

SUMMARY OF INVENTION

It is therefore an object of this invention to provide an improved calibration collimator which can be used on site as desired by a user.

It is a further object of this invention to provide a calibration system having such a calibration collimator which can periodically update correction tables.

It is a further object of this invention to provide such a calibration system which can be fully automated.

Yet another object of this invention is to provide a calibration collimator which is compatible with standard collimators and can be readily substituted on site for the standard collimator.

It is a further object of this invention to provide such a calibration collimator which can utilize the same mechanism for incrementing the standard collimator to move the calibration collimator.

A still further object of this invention is to provide a calibration collimator with widely spaced holes which can generate camera images that are much more closely spaced to increase the accuracy of position estimation.

It is a further object of this invention to provide such a calibration collimator which can have redundant sets of holes to provide additional accuracy in calibration.

It is a further object of this invention to provide such a calibration collimator which can be used for quality control in addition to recalibration of a misaligned tomography camera.

Yet another object of this invention is to provide an improved method of calibrating a tomography camera using such a calibration collimator.

This invention results from the realization that improved calibration of a tomography camera, lending itself to simple, on-site calibration, can be achieved using a calibration collimator having a wall of material which is opaque to radionuclide emissions and is movable in a first direction, the wall defining one or more patterns of openings which pass radionuclide emissions, the openings being aligned in a direction transverse to the first direction to provide an array of camera images upon movement of the wall relative to the camera, the array being produced by incremental movement of the collimator relative to the camera and exposure through the collimator to obtain an extended, time-expanded array which has a greater number of images than the number of openings.

This invention features a movable calibration collimator for a radionuclide emission tomography camera. The collimator includes a wall of material which is opaque to radionuclide emissions and is movable in a first direction relative to the camera. A first pattern of openings is defined by the wall to pass radionuclide emissions. The openings are aligned in a direction transverse to the first direction to provide an array of camera images upon movement of the wall relative to the camera. The array has a greater number of images than the number of the openings.

In one embodiment, the first pattern of openings and the array of images are each arranged in a plurality of rows parallel to the first direction. The first pattern has relatively few openings per row relative to the number of images per row, the openings being aligned in a direction oblique to the rows. The first pattern may also be arranged in a plurality of columns aligned in a second direction normal to the first direction. Each column has at least one opening located at a different position along the second direction relative to the location of holes in the other columns. The array may be arranged in a second plurality of columns which are greater in number than the plurality of pattern columns. The wall may be curved or an annulus, and the column may further include means for moving the wall by preselected increments. The openings may be holes or slots passing through the wall, the camera has a plurality of photodetectors arranged in two or more sets, each set being parallel to the first direction, and the collimator further includes a set of initializing openings defined by the wall. Each initializing opening is alignable with photodetectors in different set. It is desirable for each initializing opening to be alignable with the center of photodetectors in the corresponding set. The collimator may further include a second, redundant pattern of openings defined by the wall which is identical to the first pattern to generate a second array of camera images which can be matched with the first array.

This invention further features a calibration system having a calibration collimator and a radionuclide emission tomography camera which includes means for moving the calibration collimator relative to the camera by preselected increments in a first direction. The camera further includes means, responsive to the calibration collimator, for detecting radionuclide emissions from a radionuclide source to collect a camera image at each position of the calibration collimator for each increment. Each camera image has a position image for each opening. The camera further includes means for combining the camera images to produce a first array of images which has a greater number of position images than the number of openings.

This invention further features a method of calibrating a radionuclide emission tomography camera, including installing a calibration collimator according to this invention, moving the calibration collimator by preselected increments in the first direction, and detecting radionuclide emissions from a radionuclide source to collect a camera image at each position of the calibration collimator for each increment. Each camera image has a position image for each opening, and the method further includes combining the camera images to produce the first array having a greater number of position images than the number of openings.

In one embodiment, the method further includes locating the center of each position image, and correlating the centers with known locations of corresponding images. Position estimation correction is performed based on the correlations.

DISCLOSURE OF PREFERRED EMBODIMENT

Other objects, features and advantages will occur to those skilled in the art from the following description of a preferred embodiment and the accompanying drawings, in which.

This invention may be accomplished by a calibration collimator which is movable relative to a radionuclide emission tomography camera in which the collimator is installed. The calibration collimator is formed of a wall of material which is opaque to radionuclide emissions and movable relative to the camera in a first direction. The wall defines a first pattern of openings which pass radionuclide emissions. The openings are aligned in a direction transverse to the first direction to provide a first array of camera images upon movement of the wall relative to the camera. The first array has a greater number of images than the number of the openings.

The shape of the calibration collimator is preferably constructed to match that of a standard collimator to allow convenient substitution of the calibration collimator for the standard collimator when calibration is to be accomplished. The wall of the calibration collimator is planar when intended for a planar camera, arcuate for an arcuate camera, and is an annulus when intended for an annular camera.

Figure 1:
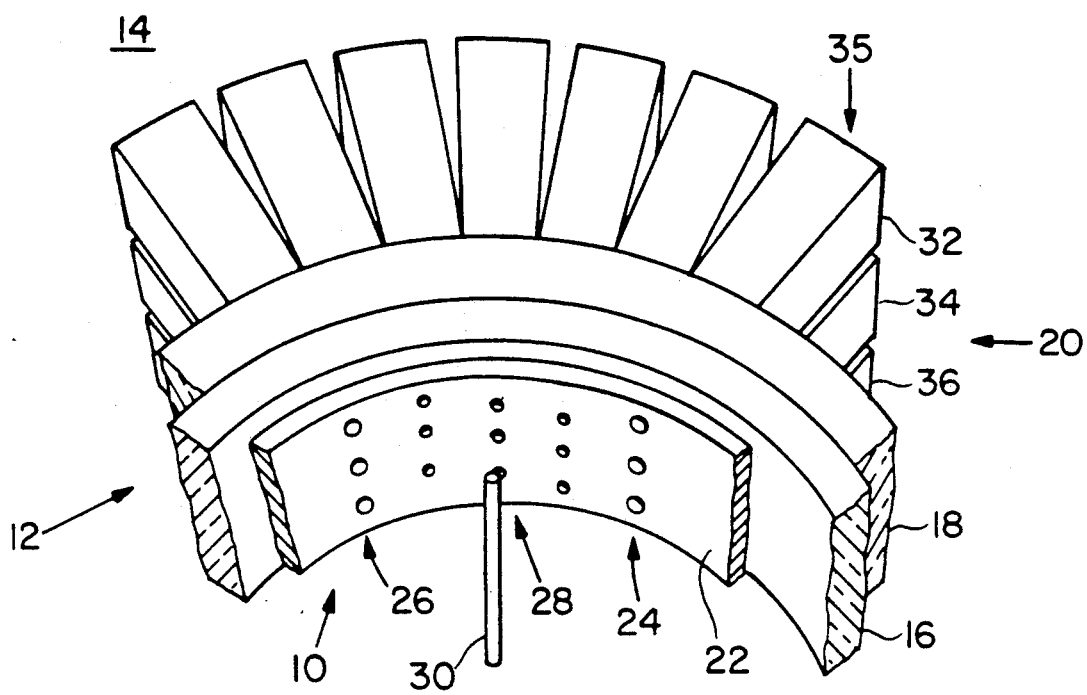
FIG. 1 is a partial, three-dimensional view of a calibration collimator according to this invention and a line source installed in a radionuclide emission tomography camera.

Calibration collimator 10, FIG. 1, is shown installed in annular radionuclide emission tomography camera 12. The combination of collimator 10 and camera 12 comprises calibration system 14 according to this invention. Camera 12 includes scintillation crystal 16, light pipe 18, and photomultiplier tubes 20. Wall 22 of collimator 10 is formed of a material which is opaque to radionuclide emissions, such as lead or material which is impregnated with lead. Initializing sets 24 and 26 of initializing openings and pattern 28 of linearity correction openings are defined by wall 22.

During calibration, line source 30 of radionuclide emissions is installed within calibration collimator 10 at the center of annular camera 12. As described in more detail below, an initializing operation is performed to provide coarse adjustment of photomultiplier tubes 20, after which a position analysis operation is performed to provide linearity correction, that is, to correct for spatial distortions in position estimation of an event. The entire disclosure of the following U.S. Pat. Nos. are incorporated herein by reference, including their disclosures of radionuclide emission camera systems: Genna et al., U.S. Pat. No. 4,095,107; Genna et al., U.S. Pat. No. 4,228,515; Genna et al., U.S. Pat. No. 4,584,478; and Pang et al., U.S. Pat. No. 4,593,198.

Figure 2:
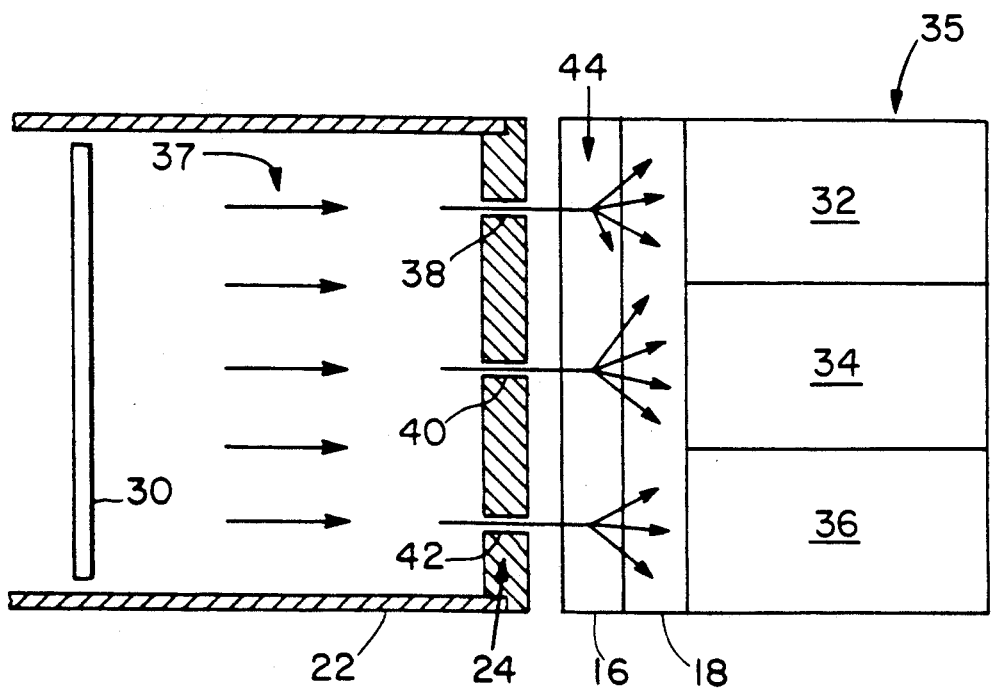
FIG. 2 is a cross-sectional view of the line source, calibration collimator, and camera of FIG. 1.
Figure 3:
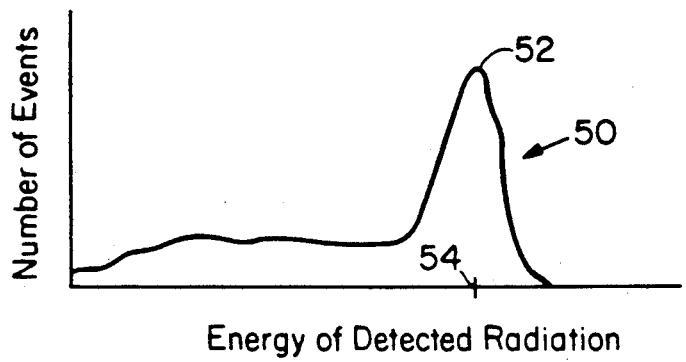
FIG. 3 is a schematic chart of the number of detected events relative to the energy of the events as measured by a photomultiplier.
Figure 4:
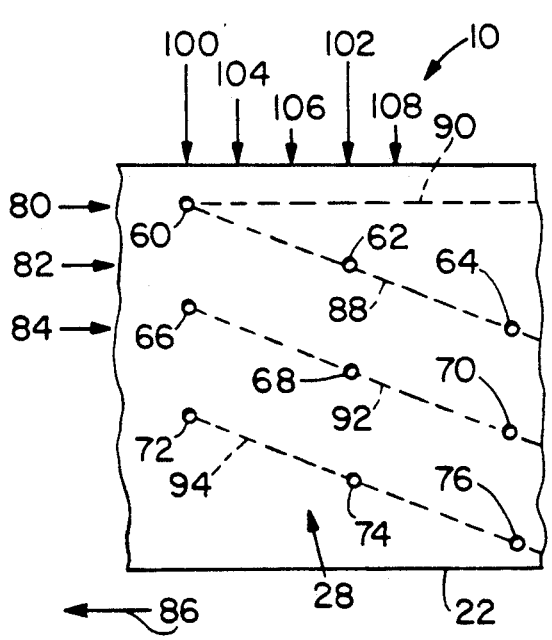
FIG. 4 is a schematic partial elevational view of the collimator shown in FIG. 1.
Figure 5:
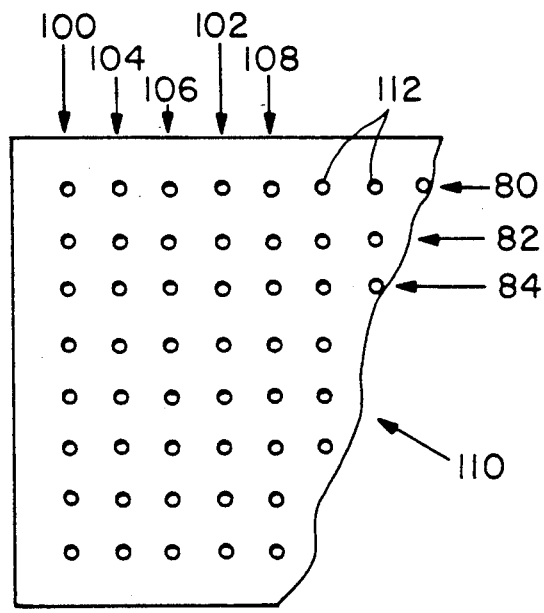
FIG. 5 is a schematic representation of the array of camera images produced upon movement of the calibration collimator of FIG. 4.

During the initializing operation, initializing sets 24, 26 are aligned with corresponding photomultiplier tubes. For example, initializing set 24 is aligned with photomultiplier tubes 32, 34, 36. Initializing sets 24, 26 are identical in this construction and enable simultaneous initialization of two columns of photomultipliers 20. As shown in cross section in FIG. 2, radionuclide emissions 37 from line source 30 impinge uniformly against wall 22. Openings 38, 40, 42 pass only the gamma radiation which is aligned with those openings. The passed gamma radiation induces scintillations 44 in scintillation crystal 16 which are measured by photomultiplier tubes 32, 34, 36. It is desirable to have only one opening aligned with each collimator, and have each opening aligned with the center of its corresponding photomultiplier tube. In one embodiment, the gain of each photomultiplier tube is adjusted to match its output for gamma radiation energy levels with the outputs of the other photomultiplier tubes. As shown in FIG. 3, energy distribution curve 50 is obtained by comparing the number of events with the energy level of each event. It is desirable for energy level 54 of photopeak 52 to correspond with the characteristic energy of the selected gamma radiation. The gain of each photomultiplier tube is adjusted to make the outputs of all the photomultiplier tubes equal. Alternatively, the characteristics of each photomultiplier tube are determined and compensation is made in software, such as by energy correction tables.

Initialization accomplished using calibration collimator 10 according to this invention is novel because sets 24, 26 of initializing openings are successively moved relative to the columns of photomultiplier tubes, such as column 35. In one construction, camera 10 has twenty-one columns of photomultiplier tubes, each with three photomultiplier tubes, for a total of sixty-three photomultipliers. The arrangement can also be classified as three sets of twenty-one photomultipliers, each set being parallel to the direction of movement. Also particular to this construction is that collimator 10 is rotated about an axis of rotation corresponding to the position of line source 30, while camera 12 remains stationary. Mechanisms for incrementally rotating a collimator are described in the above-referenced patents.

After initialization of the photomultiplier tubes is completed, position analysis is accomplished using pattern 28. Openings 60, 62, 64, 66, 68, 70, 72, 74 and 76 are holes passing through wall 22. Openings 60, 62 . . . 76 are relatively widely spaced to readily enable the camera to correlate a detected event with a particular hole location. In another construction, two or more slots are utilized.

The unique arrangement of pattern 28 enables a large array of camera images to be generated from relatively few number of openings, as described in more detail below. In this construction, there is only one hole per row, e.g., hole 60 in row 80, hole 62 in row 82, and hole 64 in row 84. Rows 80, 82, 84 are parallel to the direction of rotation indicated by arrow 86. Holes 60, 62, 64 are aligned along oblique line 88 which is transverse to the orientation of the rows, as represented by dashed line 90. Similarly, holes 66, 68, 70 are aligned along oblique line 92 and holes 72, 74, 76 are aligned along oblique line 94.

Pattern 28 is also arranged in a number of columns which are relatively widely spaced. For example, holes 60, 66, 72 are arranged in column 100 while holes 62, 68, 74 are arranged in column 102. A camera image is collected by camera 12, the camera image having a position image for each opening, that is, there is a position image for each of holes 60, 62 . . . 76. Upon incremental rotation, however, an array having a far greater number of position images is obtained. For example, if collimator 10 is rotated to successively place holes 60, 66, 72 in columns 100, 104, 106, 102, 108, and so on until an entire rotation of 360° is accomplished, array 110 is thereby produced having position images 112. Array 110 is a complete matrix of elements which are far denser than those which could be achieved using a fixed grid. The delayed exposure through rotatable collimator 10 provides an extended, time-expanded array through the incremental movement of and exposure through collimator 10.

Figure 6:
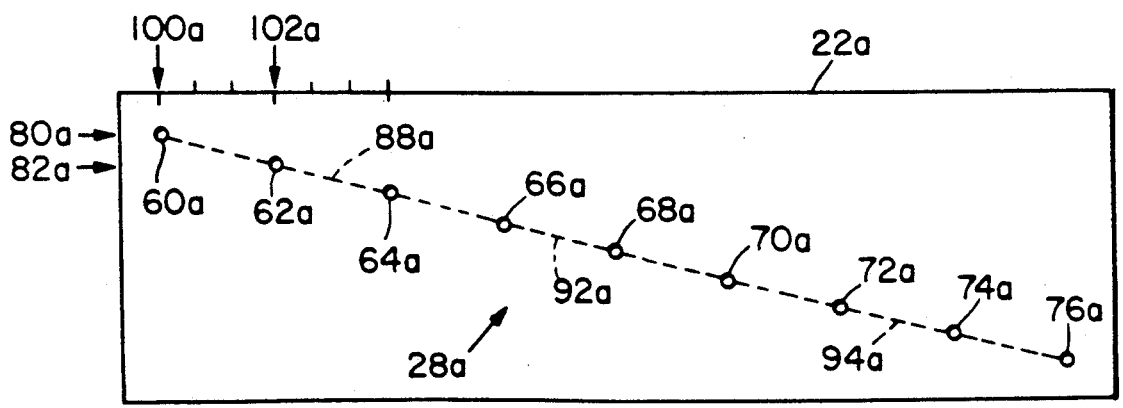
FIG. 6 is a schematic elevational view of an alternative calibration collimator according to this invention having holes aligned along a single oblique line.

Array 10 can also be accomplished by pattern 28a, FIG. 6. Pattern 28a is equivalent to a pattern derived by placing parallel lines 88, 92, 94 along a single oblique line. This correspondence is shown by line segments 88a, 92a, and 94a which are continuous in this construction. Holes 60a, 62a . . . 76a are also arranged in a plurality of rows 80a, 82a, and so forth which are parallel to the direction of rotation, there being only one opening per row. Pattern 28a is also arranged in a number of columns, such as columns 100a, 102a, which are aligned with the axis of rotation. The hole in each column is located at a different position along the axial direction relative to the location of holes in the other columns, as is true of pattern 28.

Figure 7:
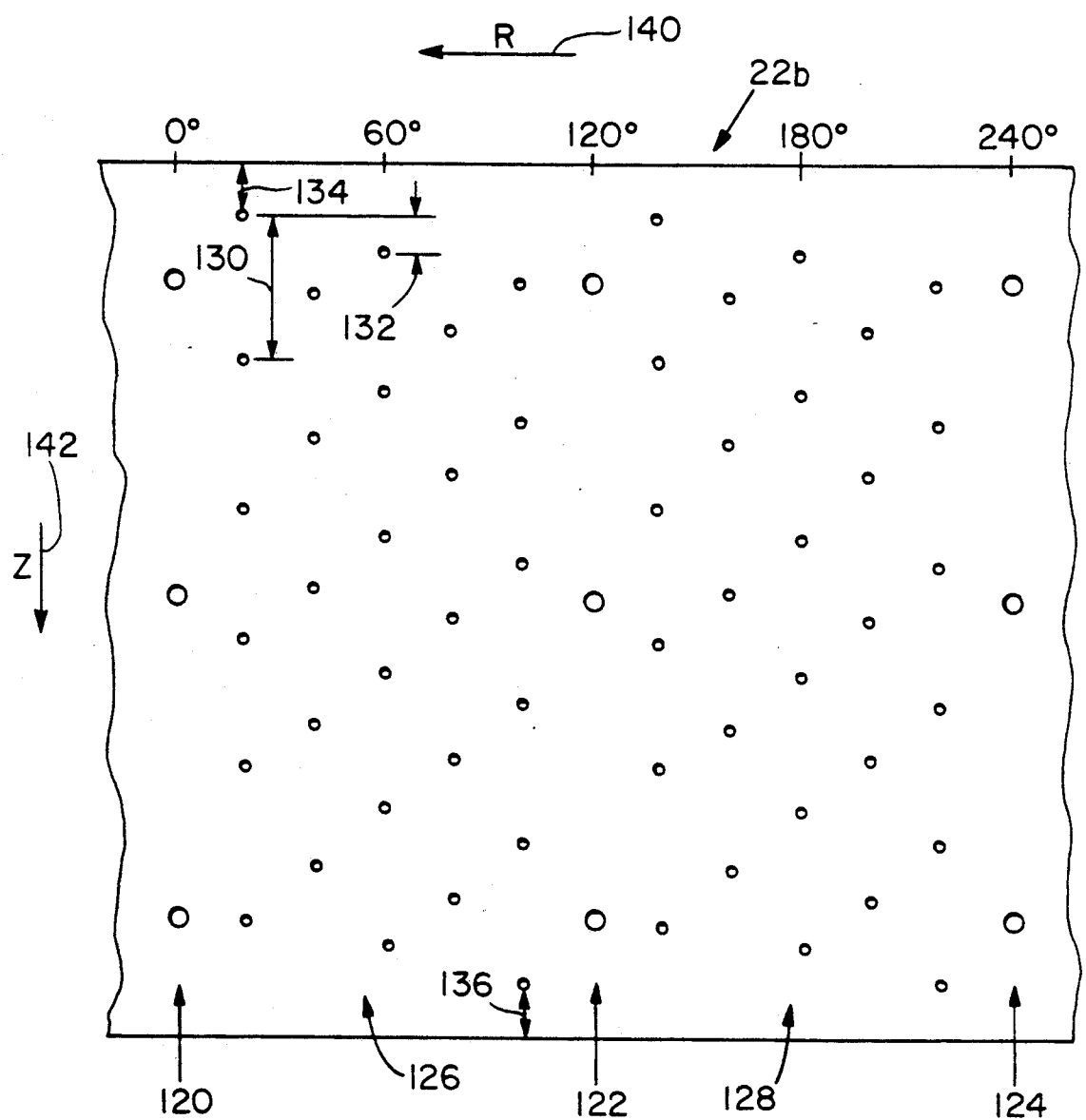
FIG. 7 is a partial schematic elevational view of a calibration collimator according to this invention having multiple patterns of openings.

An alternative calibration collimator according to this invention is shown in schematic elevational view in FIG. 7. Sets 120, 122, 124 of initializing openings are arranged at 0°, 120°, and 240°, respectively, to provide triple redundancy. Pattern 126 is arranged in five columns positioned at 20°, 40°, 60°, 80°, and 100°, respectively. The columns of second pattern 128 are positioned at corresponding increments of 20°. Within each column, holes are separated by distance 130; rows are spaced at distance 132. In one construction, dimension 130 is 20 mm and distance 132 is 4 mm. Border distances represented by arrows 134, 136 are also 4 mm in this construction. A third pattern, not shown, has columns positioned between 260° to 340° and has rows of the same spacing. Direction of rotation R is represented by arrow 140 while axial direction Z is represented by arrow 142. The holes of the patterns are 7/64 inch in diameter while the initializing holes are ⅛th inch diameter. There are a total of 93 holes in calibration collimator 22b.

Figure 8:
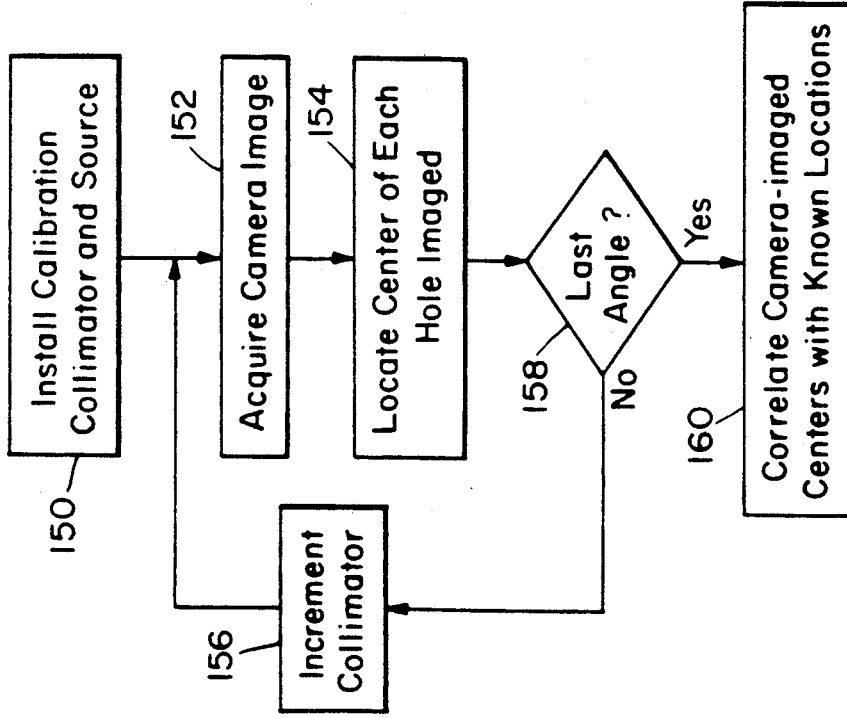
FIG. 8 is a flow chart of linearity correction using a calibration collimator according this invention.

The operation of linearity correction using a calibration collimator according to this invention is shown in FIG. 8. The calibration collimator and a line source are installed, step 150, and a camera image is acquired, step 152. The center of each hole image is located, step 154, for example by centroid analysis. The collimator is moved by a preselected increment, represented by angle theta, e.g., one degree, step 156, to acquire successive camera images until the last angle has been reached as determined in step 158. The observed theta, Z positions of the camera-imaged centers are correlated with known collimator hole locations, step 160. Although the known hole locations are spaced at equal, uniform increments, the observed camera-imaged centers are nonuniformly distributed due to nonlinearities in the camera system. In one embodiment, a table of position errors is generated based on the correlation.

After the camera-imaged centers are correlated with known locations, one or more correction tables are generated, step 162. One such technique for this procedure described by S. E. King, F. J. Ih, C. B. Lim, R. Chaney, and E. Gray in "Spectral-Spatial-Sensitivity Distortion Trends and an Accurate Correction Method in Scintillation Gamma Cameras," *IEEE Transactions on Nuclear Science*, Vol. NS-32, February 1985. Preferably, interpolation and extrapolation are utilized to obtain very fine increments of linearity corrections. Correction tables generated by a method according to this invention, however, are more accurate than those generated by conventional methods because the camera images contain far more images than those possible using a fixed grid. As described above, this is possible because the spacing between holes must be far enough so that it can be determined where each detected event originated without confusing its origin with other possible locations. In other words, a calibration system and method using a calibration collimator according to this invention provide exposures which are much denser than the hole patterns themselves. Further, these dense position images are acquired by moving the collimator in a single direction; movement in two directions is not required.

While the collimator has been described as movable, the scope of the invention includes calibration in which a camera is moved relative to a fixed collimator having one or more patterns according to this invention. Also, additional energy correction can be performed for the photomultipliers of the camera using these patterns.

Figure 9:
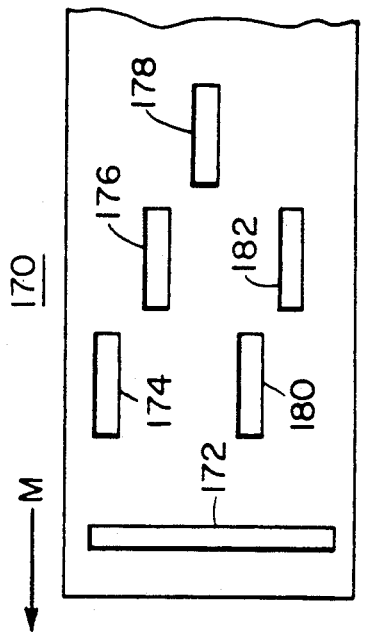
Figure 10:
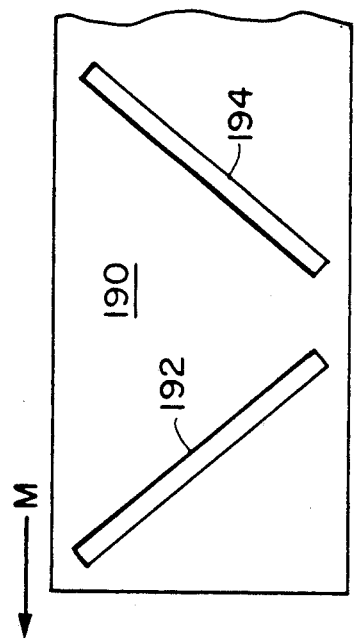
Figure 11:
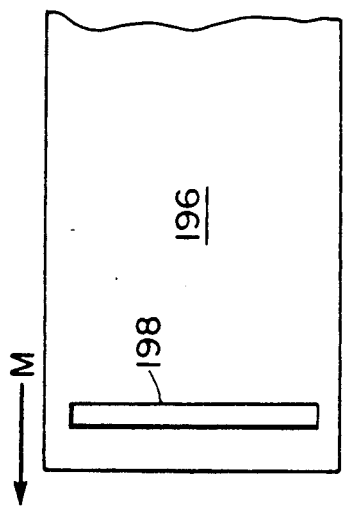

Alternative calibration collimators according to this invention can have one or more slots instead of holes. Collimator 170, FIG. 9, has elongated slot 172 which is normal to the direction of movement M. Collimator 170 further includes staggered slots 174, 176, 178, 180, 182, which are parallel to direction of movement M. Collimator 190, FIG. 10, has two oblique slots 192, 194, which are preferably normal to each other. Collimators 170 and 190 provide two-dimensional arrays of intersecting line images which can be used for two-dimensional calibration. In contrast, an array of parallel line images are produced by collimator 196, FIG. 11, which has a single slot 198. Such an array can be used for one-dimensional calibration.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A rotatable calibration collimator for a radionuclide emission tomography camera, comprising:
    a wall of material which is opaque to radionuclide emissions and is rotatable in a first direction about an axis of rotation;
    a first pattern of openings defined by said wall for passing radionuclide emissions, said openings being aligned in a direction transverse to said first direction to provide a first array of camera images upon rotation of said wall, the first array having a greater number of images than the number of said openings;
    the first pattern of said openings and the first array of said images being each arranged in a plurality of rows parallel to the first direction, the first pattern having relatively few openings per row relative to the number of images per row; and
    the first pattern being further arranged in a plurality of columns aligned in a second direction normal to said first direction and parallel to the axis of rotation, each column having at least one opening located at a different position along said second direction relative to the location of holes in the other columns.

2. The collimator of claim 1 in which each opening in each column is located at a different position along said second direction.

3. The collimator of claim 2 in which the first array is arranged in a second plurality of columns which are greater in number than the plurality of pattern columns.

4. A calibration collimator system for a radionuclide emission tomography camera system for generating a composite image array of a set of closely spaced image positions comprising:
    a calibration collimator having a wall which is opaque to radionuclide emissions having a pattern formed from a subset of openings fewer in number and more widely spaced than said composite image array of said set of closely spaced image positions; and
    means for moving said collimator in a first direction relative to the camera in incremental steps which offset successive images of said widely spaced subset pattern of openings for generating said composite image array of said set of closely spaced image positions.

5. The calibration collimator of claim 4 in which the subset pattern of widely spaced openings and the composite image array of a set of closely spaced image positions are each arranged in a plurality of rows parallel to the first direction, the subset pattern having relatively few openings per row relative to the number of offset images per row, and said subset pattern of openings being aligned in a direction oblique to the rows.

6. The calibration collimator of claim 5 in which the subset pattern of widely spaced openings has one opening per row.

7. The calibration collimator of claim 4 in which the subset pattern of widely spaced openings is arranged in a plurality of columns aligned in a second direction normal to said first direction, each column having at least one opening located at a different position along said second direction relative to the location of openings in the other columns.

8. The calibration collimator of claim 7 in which each opening in each column is located at a different location along said second direction.

9. The calibration collimator of claim 4 in which said wall is curved.

10. The calibration collimator of claim 4 in which said wall is an annulus.

11. The calibration collimator of claim 4 in which said subset pattern of widely spaced openings are holes passing through said wall.

12. The calibration collimator system of claim 4 in which the camera has a plurality of photodetectors arranged in two or more sets, each set being parallel to the first direction, and the collimator system further includes a set of initializing openings defined by said wall, each said initializing opening being alignable with photodetectors in a different set.

13. The calibration collimator system of claim 12 in which each initializing opening is alignable with a center of photodetectors in the corresponding set.

14. The calibration collimator of claim 4 in which said subset pattern of widely spaced openings include slots passing through said wall.

15. The calibration collimator of claim 4 in which said subset pattern of widely spaced openings are slots passing through said wall, at least one of the slots being oriented transversely to the first direction.

16. The calibration collimator of claim 15 in which at least one of the slots is oriented obliquely to the first direction and the slots are non-parallel to each other.

17. A calibration system comprising:
   a calibration collimator;
   a radionuclide emission tomography camera system including:
   means for moving said calibration collimator relative to said camera by preselected increments in a first direction;
   means, responsive to said calibration collimator, for detecting radionuclide emissions from a radionuclide source to collect a camera image at each position of said calibration collimator for each increment, each camera image having a position image for each opening; and
   means for combining the camera images to produce a composite image array of a set of closely spaced image positions; and
   said calibration collimator including a wall of material which is oblique to radionuclide emission, and a subset pattern of openings defined by said wall for passing radionuclide emissions, said subset pattern of openings being aligned in a direction transverse to said first direction to provide the composite image array of camera images, the composite image array having a greater number of position images than the number of said openings.

18. The calibration collimator of claim 17 in which the subset pattern of widely spaced openings and the composite image array are each arranged in plurality of rows parallel to the first direction, said subset pattern having relatively few openings per row relative the number of offset images per row, and said openings being aligned in a direction oblique to the rows.

19. The calibration collimator of claim 17 in which the subset pattern of widely spaced openings are arranged in a plurality of columns aligned in a second direction normal to said first direction, each column having at least one opening located at different position along said second direction relative to the location of openings in the other columns.

20. A method of calibrating a radionuclide emission tomography camera, comprising:
   installing a calibration collimator, the calibration collimator including a wall of material which is oblique to radionuclide emissions, the wall defining a subset pattern of openings few in number and widely spaced for passing radionuclide emissions, and the openings being aligned in a direction transverse to a first direction to provide a composite image array of camera images;
   moving the calibration collimator relative to the camera by preselected increments in the first direction;
   detecting radionuclide emissions from a radionuclide source to collect a camera image at each position of the calibration collimator for each increment, said camera image having a position image for each opening; and
   combining the camera images to produce a composite image array having a greater number of position images than the number of openings.

21. The method of claim 20 further including locating the center of each position image, and correlating the centers with known locations of corresponding openings.

22. The method of claim 21 further including performing position estimation correction based on the correlations.

* * * * *